(12) United States Patent
Franklin

(10) Patent No.: US 9,358,845 B2
(45) Date of Patent: Jun. 7, 2016

(54) WHEEL APPARATUS

(71) Applicant: Interco Tire Corporation, Rayne, LA (US)

(72) Inventor: Dennis Franklin, Yuma, AZ (US)

(73) Assignee: Interco Tire Corporation, Rayne, LA (US)

( * ) Notice: Subject to any disclaimer, the term of this patent is extended or adjusted under 35 U.S.C. 154(b) by 235 days.

(21) Appl. No.: 13/788,881

(22) Filed: Mar. 7, 2013

(65) Prior Publication Data

US 2013/0234497 A1 Sep. 12, 2013

Related U.S. Application Data

(60) Provisional application No. 61/608,349, filed on Mar. 8, 2012.

(51) Int. Cl.
*B60C 15/02* (2006.01)
*B60B 21/10* (2006.01)
*B60B 7/01* (2006.01)
*B60B 3/00* (2006.01)
*B60B 7/06* (2006.01)
*B60B 21/12* (2006.01)
*B60B 7/00* (2006.01)
*B60B 7/02* (2006.01)
*B60B 7/14* (2006.01)

(52) U.S. Cl.
CPC ............ *B60C 15/0226* (2013.04); *B60B 3/007* (2013.01); *B60B 7/01* (2013.01); *B60B 7/063* (2013.01); *B60B 21/102* (2013.01); *B60B 21/104* (2013.01); *B60B 21/12* (2013.01); *B60B 7/0073* (2013.01); *B60B 7/02* (2013.01); *B60B 7/066* (2013.01); *B60B 7/14* (2013.01); *B60B 2900/212* (2013.01); *B60B 2900/721* (2013.01)

(58) Field of Classification Search
CPC ............ B60B 3/02; B60B 3/10; B60B 3/007; B60B 21/10; B60B 21/102; B60B 21/104; B60B 21/106; B60B 21/108; B60B 7/01; B60B 7/063; B60B 7/14; B60B 21/12; B60C 15/0226; B60C 15/0209; B60C 15/0213
See application file for complete search history.

(56) References Cited

U.S. PATENT DOCUMENTS 3,669,174 A * 6/1972 Mills .................... B60C 15/0226
152/375
3,916,970 A * 11/1975 Owens ................ B60C 15/0226
152/379.4

FOREIGN PATENT DOCUMENTS

DE 2348863 A1 * 4/1975 .......... B60C 15/0226
DE 2415254 A1 * 10/1975 .............. B60B 21/12

* cited by examiner

*Primary Examiner* — Kip T Kotter
(74) *Attorney, Agent, or Firm* — Ted M. Anthony

(57) ABSTRACT

A wheel assembly for use on vehicles in rugged conditions including, without limitation, off-road and trail conditions. A rim assembly having a rim flange is supported by a central hub member. The rim flange has a bead seat and allows a tire—including an under inflated tire—to flex without chaffing or cutting of the tire. A sacrificial abrasion ring is mounted to the outer surface of the rim flange. An optional removable accessory cap can mount to the wheel assembly to prevent mud, snow and/or other debris from collecting in the center of the wheel assembly.

7 Claims, 4 Drawing Sheets

WHEEL APPARATUS

CROSS REFERENCES TO RELATED APPLICATION

Priority of U.S. Provisional Patent Application Ser. No. 61/608,349, filed Mar. 8, 2012, incorporated herein by reference, is hereby claimed.

STATEMENTS AS TO THE RIGHTS TO THE INVENTION MADE UNDER FEDERALLY SPONSORED RESEARCH AND DEVELOPMENT

None

BACKGROUND OF THE INVENTION

1. Field of the Invention

The present invention pertains to a wheel assembly for use on vehicles. More particularly, the present invention pertains to a wheel assembly adapted for use in rugged conditions including, without limitation, off-road and trail conditions.

2. Brief Description of the Prior Art

The use of motorized vehicles for off-road and trail riding in extreme conditions, particularly for recreational purposes, has experienced a significant increase in popularity in recent years. Enthusiasts frequently invest substantial amounts of time and money on vehicles in an effort to make such vehicles capable of "conquering" the next trail or off-road challenge. Despite this fact, one area of vehicle modification that has not been aggressively addressed, particularly by the aftermarket industry, is an appropriate wheel assembly for use in both normal and extreme conditions.

Existing wheel assemblies (and particularly after market wheel assemblies) are frequently constructed with appearance or "show and shine" as a primary consideration. Wheel manufacturers are, of course, concerned about satisfying Department of Transportation (DOT) or other regulatory standards for structural integrity. However, once such standards are satisfied, the design process generally focuses on appearance, frequently at the expense of functionality and/or wheel performance.

Many conventional wheel assemblies include a rim section which provides an attachment surface for a tire to be installed. Tires are typically constructed of rubber and equipped with "tire beads" along the edges of the tires. The tire beads are used to attach a tire to a rim section. In most cases, tires are inflated with pressurized gas (typically air) to provide desired cushion support and performance characteristics. When a tire is properly inflated, the gas pressure within the tire acts to keep the tire beads attached to the rim section.

Drivers of off-road vehicles commonly decrease the gas pressure in their tires; such reduction in pressure makes the tires spread out, creating more surface area for the tires' treads to grip and conform to the underlying terrain. However, if the pressure is too low, there may not be enough pressure to keep the tire bead on the rim section, thus causing the bead to pop off the wheel a phenomenon commonly referred to as "losing a bead". So-called "bead-locks", which clamp a bead on a wheel, are often used for such applications; however, existing bead-locks are generally not approved for use on highways or other public roads.

Existing wheel assemblies designed for use in extreme conditions (such as, for example, off-road service, trail riding and/or other recreational uses)—including wheel assemblies equipped with conventional bead locks—generally suffer from a number of significant shortcomings. Namely, such existing wheel assemblies typically do not permit the deflation of large-volume specialty tires in a rapid manner while allowing deflation progress to be monitored. Moreover, such existing wheel assemblies frequently do not permit convenient tire-inflation (particularly when the tires have been detached from a bead area), and/or the dismounting and mounting of tires in a field environment. Additionally, existing wheel assemblies generally do not ensure air retention under extreme tire deflection, particularly at ultra low inflation pressures.

Moreover, existing wheel assemblies are frequently lacking with respect to "bead retention". For example, existing bead-lock systems are frequently not legal for use on streets or public roads, and can be extremely expensive. Furthermore, changing of tires equipped with such bead-locks can be a long, difficult and laborious process.

Existing wheel assemblies also frequently lack proper offsets, which can be critical to proper vehicle tire fitment and geometry. Such existing wheel assemblies often perform poorly in deep mud and/or snow conditions; users are often forced to fight mud or snow packing around the center of such existing wheels, which can result in broken valve stems, extreme out-of-balance conditions, and many other conditions that negatively impact wheel performance.

Thus, there is a need for a wheel assembly that can be safely and efficiently used in normal, as well as extreme conditions. The wheel assembly should satisfy all government standards and regulatory requirements including those relating to use on streets/public roads, while overcoming the problems associated with existing wheel technology. The wheel assembly should be beneficially built on existing equipment while addressing the issues befalling the emerging recreational vehicle wheel market including, without limitation, bead retention issues and deficiencies with existing bead-lock technology.

SUMMARY OF THE INVENTION

The wheel assembly of the present invention comprises a disk portion and hub that generally serves as an attachment point for connecting said wheel assembly to an axle and braking system of a vehicle. In the preferred embodiment, said disk portion comprises a hub having a central bore (for receiving an axle) which is itself disposed substantially in the center of a bolt-hole pattern. Said bolt-hole pattern comprises a plurality of holes for receiving bolts; lug nuts can then attach to said bolts in order to secure said wheel assembly to said axle. Said hub and bolt-hole pattern can be configured to custom-fit different vehicles.

Said disk portion extends radially outward from said hub and attaches to a rim assembly which provides an attachment surface for a tire to be installed. Said rim assembly can also include a visually appealing ornamental design, although said rim assembly typically must meet certain load and fitment standards as established by governmental agencies and/or other regulatory bodies. The dimensions of the rim assembly, particularly width and diameter of the rim, determine the size and/or type of tire that can be used support a vehicle.

A tire, typically constructed of rubber and equipped with edge "tire beads", is attached to said rim assembly. Said tire provides cushioned support for the weight of a vehicle, as well as traction control for moving and stopping of said vehicle. Additionally, said tire also provides a replaceable barrier between said rim assembly and the underlying terrain. In most cases, tires are inflated with pressurized gas (frequently air) to provide desired cushion support and performance characteristics. When the tire is properly inflated, the gas pressure within the tire acts to keep the tire beads located within a bead "notch" or channel, thereby assuring attachment of a tire to the wheel assembly.

The wheel assembly of the present invention can be cast, machine billet or forged, or machined from aluminum alloys or steel suitable for anticipated use including for support and rigors of extreme off highway use. Further, because the wheel assembly of the present invention can be used in extreme conditions, corrosion protection can be beneficially addressed in and around the entire wheel assembly. Specifically, in the preferred embodiment, an alloy material can be used which is resistant to salts, water, high alkali soils, as well as any other highly abrasive or corrosive material. Said corrosion protection can maintain cosmetic appearance and structural integrity. Additionally, an optional layer of specialty paints and/or coatings can be provided as a defense against corrosion, abrasion and/or pitting; different coatings may be used in different areas for different functions and some areas may not be coated at all but left natural or anodized for protection.

In the preferred embodiment, said rim assembly further comprises an outer edge—also known as a "rim flange"—that allows a tire to flex without chaffing or cutting of such tire. If desired, balance weight(s) may be attached; however, tape-on weights should ideally be used to balance the wheel assembly of the present invention because such weights are not susceptible of being knocked off as easily as other weights. The bead notch of the present invention allows for normal movement, as well as maximum deflection of the tire rim flange without cutting, gouging or otherwise damaging a tire.

A relief notched into the outer edge of the wheel assembly of the present invention allows clearance for tires that are equipped with "rim guards" sometimes called wheel guards. Without such relief, said rim guards can act as a fulcrum and deflate a tire in extreme deflection conditions at low air pressure. In the preferred embodiment, an abrasion ring or rock guard is also cast into the outer hoop adjacent to and as part of the bead notch.

In some cases an additional optional sacrificial ring may be attached to said abrasion ring of the wheel with flush mount fasteners. Said ring can be constructed of stamped steel or machined aluminum in which two ridges on either side of the ring can slide over the existing abrasion ring locking itself into the bead notch and the inside edge of the abrasion ring. The primary function is to allow for an area that can withstand all the weight of a vehicle to address an impact with a rock or other object. The ring can be beneficially designed so that it can be gouged or damaged in normal operation without compromising operational integrity.

In the preferred embodiment, an optional removable accessory cap member can be received on said wheel assembly to prevent mud, snow and/or other debris from collecting in the center of the wheel assembly. Said cover member can be installed when said wheel assembly is used in extreme conditions. Moreover, said accessory cap can be constructed of aluminum, reinforced plastic or other suitable material, such that said cap can rest against a machined lip member of the rim assembly.

BRIEF DESCRIPTION OF DRAWINGS/FIGURES

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

DETAILED DESCRIPTION OF A PREFERRED EMBODIMENT

Figure 1:
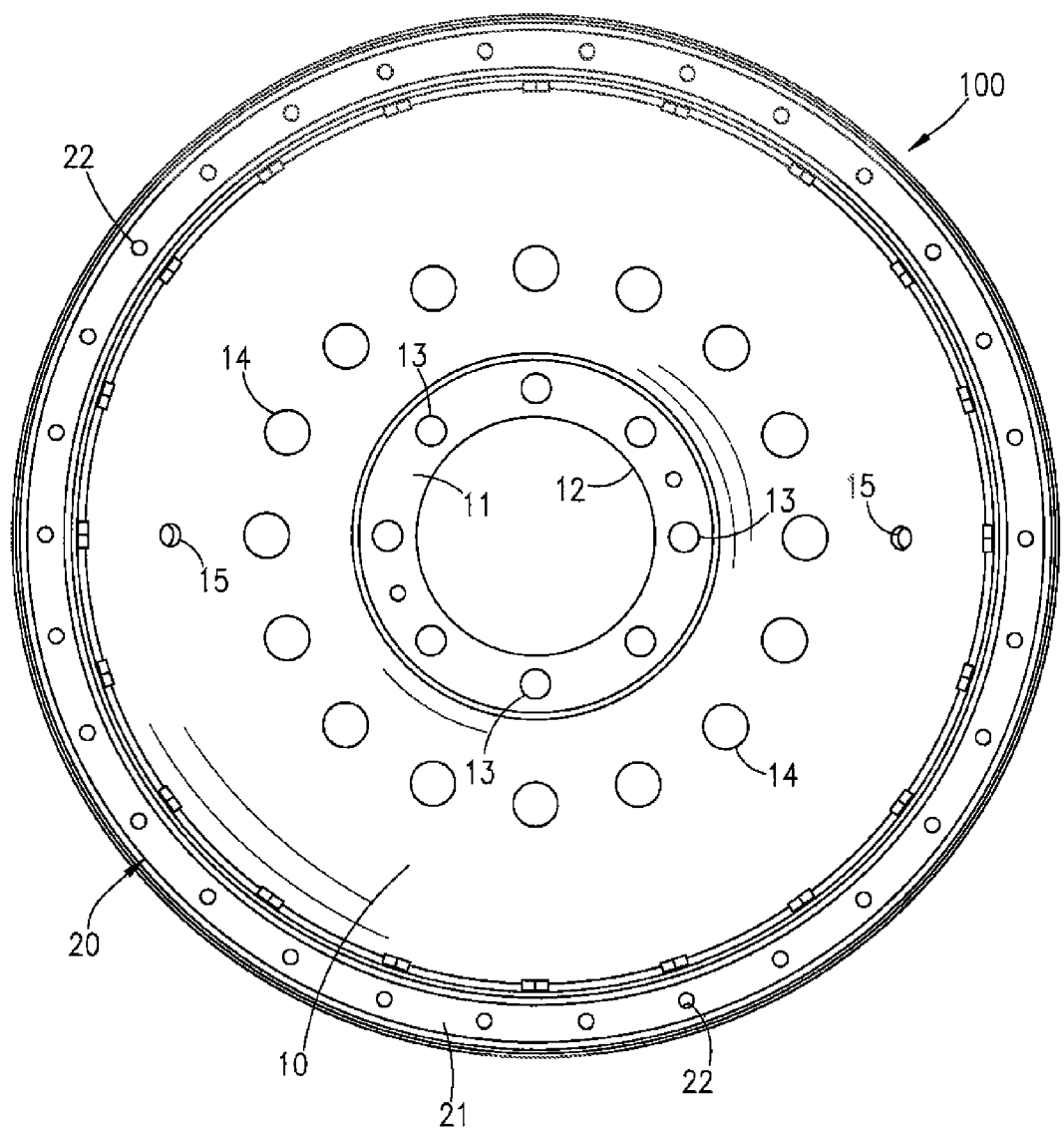
FIG. 1 depicts a side view of a wheel assembly of the present invention.

Referring to the drawings, FIG. 1 depicts a side view of a wheel assembly 100 of the present invention. Wheel assembly 100 of the present invention comprises a disk portion 10 and hub 11 that generally provides an attachment point for connecting said wheel assembly 100 to an axle and braking system of a vehicle (not shown in FIG. 1).

In the preferred embodiment, said disk portion 10 comprises a hub 11 having a central bore or opening 12 for receiving a vehicle axle. Said central bore 12 is positioned substantially in the center of a pattern of surrounding bolt holes 13 in said hub 11. Bolt holes 13 can receive bolts from a vehicle axle (typically an axle backing plate), and lug nuts (not shown in FIG. 1) can attach to said bolts in order to secure said disk portion (and, thus, said wheel assembly 100) to a vehicle axle. Said hub 11 and the pattern of bolt-holes 13 can be specifically configured to fit the bolts of particular vehicle axles. Central bore 12 may be located and machined in such a fashion that it fits the hub center of an axle in a "hub-centric" manner.

Said disk portion 10 extends radially outward from said hub 11 and attaches to a rim assembly 20. Said disk portion 10 can also include a visually appealing ornamental design, such as a pattern of holes 14 (or, for example, cut-outs, raised elements or other cosmetic features). Said holes 14 also provide a functional cooling effect by allowing heat to escape through wheel assembly 100. It is to be observed that the design of said disk portion (10 including, without limitation, angles, width, taper, and number of holes) may vary with application, cooling or other requirements by a vehicle manufacturer.

Because said wheel assembly 100 must meet certain load and fitment standards as established by governmental agencies and/or other regulatory bodies, holes 14 should not detract from the structural integrity or functionality of said wheel assembly. The dimensions of disk portion 10 and rim assembly 20, and particularly width and diameter of said rim assembly 20 generally, determine the size and/or type of tire that can be used support a vehicle.

In the preferred embodiment, wheel assembly 100 of the present invention should be beneficially resistant to abrasion or damage. Wheels are frequently gouged by rocks or other objects during use, particularly during off-road or recreational use. In many cases, wheels suffer nicks, cuts or gouges; in extreme cases, the outer surfaces of a wheel assembly can experience large dents, bending or other damage that can render a wheel unserviceable.

Cast abrasion ring 21 is provided on the outboard surface of wheel assembly 100 (that is, the surface of said wheel assembly 100 that is facing away from a vehicle to which it is mounted). Cast abrasion ring 21 provides additional strength to rim assembly 20, as well as tire protection, especially during use in hostile environments or difficult conditions.

Said abrasion ring 21 can beneficially include a plurality of dimples 22 disposed on the outer surface of said abrasion ring 21. In the preferred embodiment, said dimples are evenly spaced apart, are approximately 3/16 inch in depth and approximately 1/4 inch in diameter. Said dimples 22 can serve as structural indicators; if a gouge or gash on said abrasion ring 21 penetrates such ring 21 deeper than said dimples 22, it serves as an indicator that structural integrity is compromised. In such cases, repair is generally discouraged, since any welding may affect the heat treating of the assembly, making future failure more likely.

Still referring to FIG. 1, in addition an optional removable and sacrificial abrasion ring may be provided and attached the outer surface of rim assembly 20. Said optional abrasion ring allows a tire to deform around the outer edge of rim assembly 20 without damaging said tire, while deflecting debris and preventing such debris from entering any space existing between said abrasion ring and said rim assembly 20.

Still referring to FIG. 1, in the preferred embodiment wheel assembly 100 includes two valve stem holes 15 extending through disk portion 10; said two valve stem holes 15 are beneficially separated approximately 180-degrees apart from one another. Further, in the preferred embodiment, one such valve stem hole 15 can be equipped with a rapid air deflator, while the other valve stem hole 15 can be equipped with a standard metal valve stem or a short synthetic or rubber snap-in stem.

The design and orientation of said valve stem holes 15 allow either or both of said holes 15 to be used for injecting air to inflate a tire, with at least one of said valve stem holes generally always being positioned in an accessible area (that is, not being buried beneath dirt, sand, snow, mud or other debris). Further, the design and orientation of said valve stem holes 15 also permit rapid deflation or inflation of a tire through a valve disposed in one hole, while monitoring air pressure changes through a valve in the other valve hole. Said valve stem holes 15 are also beneficially provided within the recessed area formed by concave or "drop-center" of the disk portion 10; in this position, valve stems disposed within said valve stem holes 15 are strategically placed as far inside as allowed by the drop center area in order to protect against undesired contact with rocks, debris or other objects.

Figure 2:
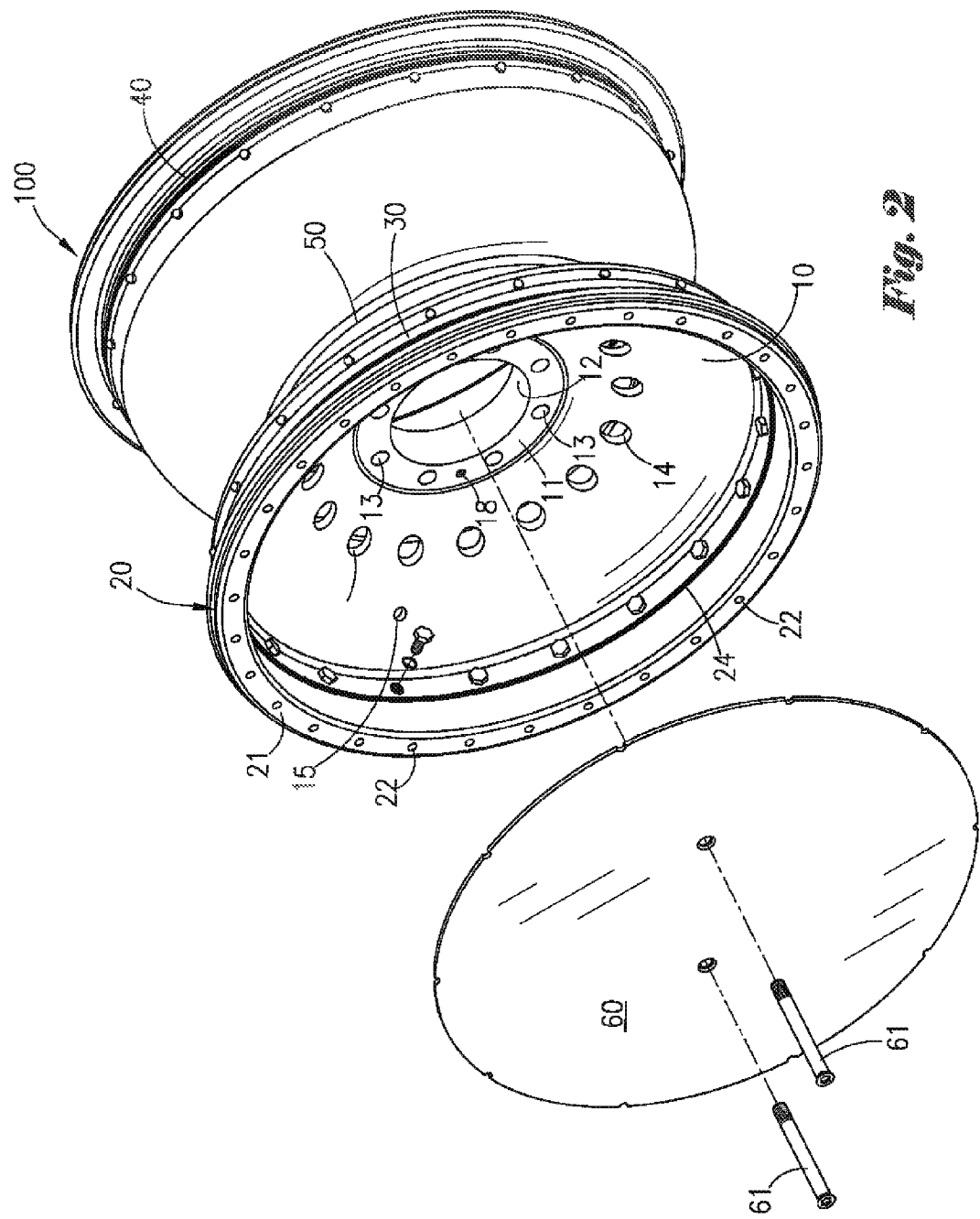
FIG. 2 depicts a side perspective view of a wheel assembly of the present invention.

FIG. 2 depicts a side perspective view of a wheel assembly 100 of the present invention. Wheel assembly 100 of the present invention comprises a disk portion 10 having hub 11 and a central bore 12 for receiving a vehicle axle. Said central bore 12 is positioned substantially in the center of a pattern of bolt holes 13 in said hub 11. Said disk portion 10 extends radially outward from said hub 11 and attaches to (or is integrally formed with a rim assembly 20. In the preferred embodiment depicted in FIG. 2, said disk portion 10 has a curved and substantially concave shape permitting easy access to lug nuts securing wheel assembly 100 to a vehicle axle. The outer surface of said disk portion 10 is beneficially machined or otherwise formed to a slick surface to allow for easy cleaning and assist in self-cleaning of mud, snow while operating in extreme conditions. Said disk portion 10 can also include a plurality of holes 14 extending through said disk portion 10.

Rim assembly 20 includes a rim flange defining a radially outermost edge of said rim assembly 20. Still referring to FIG. 2, cast abrasion ring 21 is provided on the outboard surface of rim assembly 20 and, more specifically, said rim flange. Abrasion ring 21 beneficially includes a plurality of dimples 22 disposed on the outer surface of said abrasion ring 21. Wheel assembly 100 further includes valve stem holes 15 extending through disk portion 10. In the preferred embodiment, a second valve stem hole (not visible in FIG. 2) extends through disk portion 10 and is positioned approximately 180 degrees away from valve stem hole 15 depicted in FIG. 2.

As depicted in FIG. 2, rim assembly 20 has parallel outer bead seat area 30 and inner bead seat area 40 disposed on either side of said rim assembly 20. Further, rim assembly 20 is shaped to form well area 50 between bead seat areas 30 and 40—a configuration sometimes referred to as a "drop center area".

Figure 3:
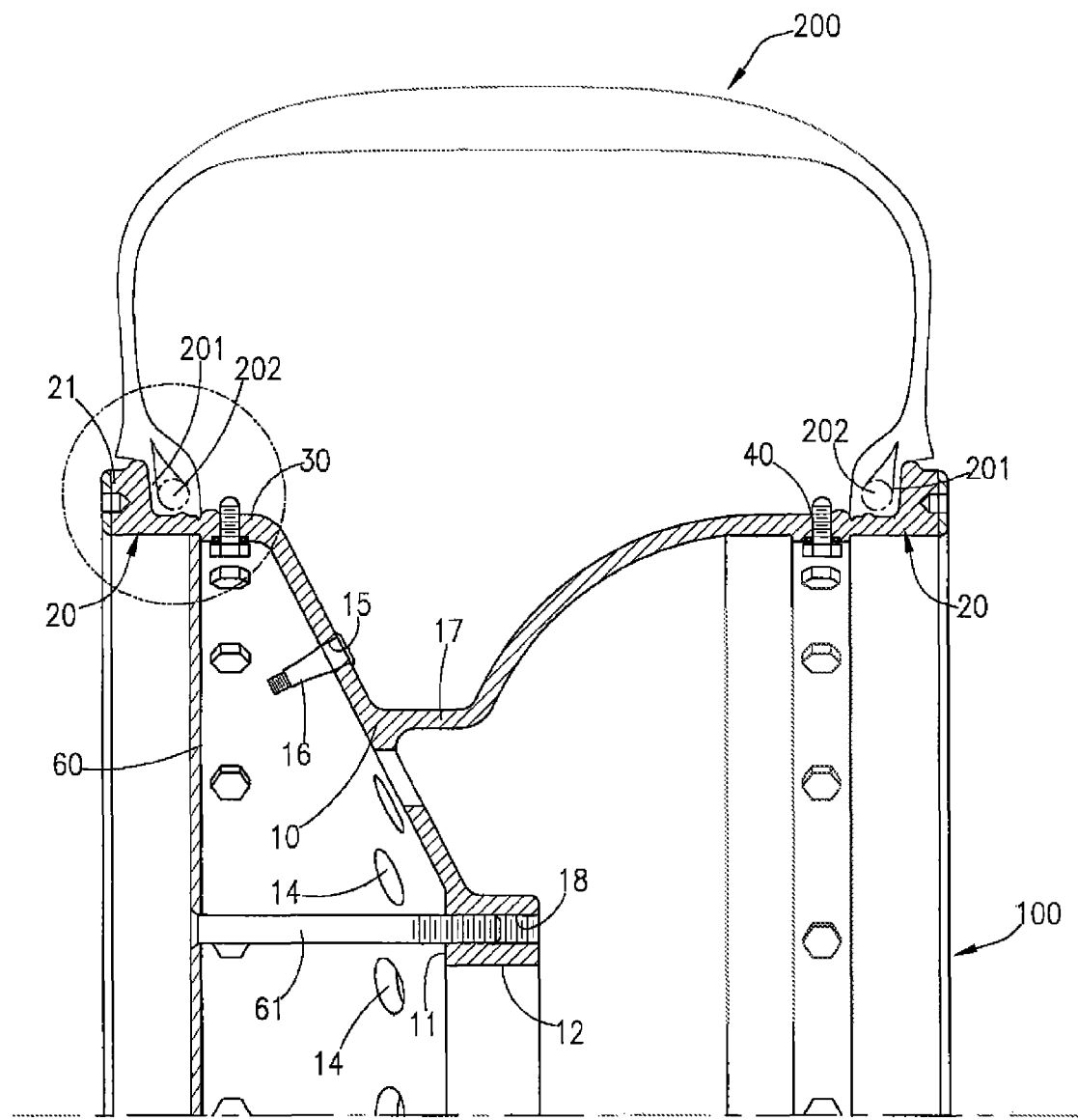
FIG. 3 depicts an end sectional view of a wheel assembly of the present invention.

FIG. 3 depicts an end sectional view of wheel assembly 100 of the present invention. Wheel assembly 100 of the present invention comprises a disk portion 10 having hub 11 and a central bore 12 for receiving a vehicle axle. Said disk portion 10 extends radially outward from said hub 11 and attaches to (or is integrally formed with) a rim assembly 20. A plurality of holes 14 extend through said disk portion 10. Abrasion ring 21 is provided on the outer surface of rim assembly 20. Valve stem 16 is mounted within valve stem hole 15 which extends through disk portion 10, and permits inflation/deflation of a tire 200 mounted to wheel assembly 100.

Rim assembly 20 forms a deep drop well 17 generally positioned between parallel bead seat areas 30 and 40. In the preferred embodiment, said deep drop well 17 is offset such that it is oriented closer to the outboard surface of wheel assembly 100 (that is, the surface of said wheel assembly 100 that is facing away from a vehicle to which it is mounted) than the inboard of said wheel assembly 100 (that is, the surface of said wheel assembly 100 that is facing toward a vehicle to which it is mounted). Said deep drop well increases the strength of wheel assembly 100 while reducing weight of said wheel assembly. Further, said deep drop well 17 facilitates the easy mounting of a tire 200 to said wheel assembly 100, as well as the dismounting of said tire 200 from said wheel assembly 100. Because the wheel assembly 100 of the present invention can be beneficially used in rugged terrain and remote locations, said deep drop well 17 allows for tire mounting and dismounting in the field and without specialized tools.

Tire 200, constructed of rubber or other material having suitable properties, and equipped with edge "tire beads" 201, is attached to rim assembly 20. Each tire bead 201 is essentially the inner circle of tire 200; that is, tire beads 201 are the part of tire 200 that connects said tire 200 to rim assembly 20. As depicted in FIG. 3, said tire bead 201 comprises rubber coated tire cord that is reinforced with a steel cable 202. In most instances, tire beads 201 are constructed of very sturdy and relatively inflexible material, which allows for a high friction point and an excellent grip against rim assembly 20.

Said tire 200 provides cushioned support for the weight of a vehicle, as well as traction control for moving and stopping of said vehicle. Additionally, said tire 200 also provides a replaceable barrier between said wheel assembly 100 and the underlying terrain. Tire 200 is inflated with pressurized gas (typically air) to provide desired cushion support and performance characteristics. When said tire is properly inflated, the gas pressure within tire 200 acts to force tire beads 201 outward, keeping said tire beads 201 located within bead seat areas 30 and 40, thereby assuring attachment of tire 200 to wheel assembly 100.

Referring back to FIG. 2, an optional removable accessory cap member 60 can be installed on wheel assembly 100 to prevent mud, snow and/or other debris from collecting within said wheel assembly 100. Said cap member 60 can be optionally installed when said wheel assembly 100 is used in extreme conditions, or removed when not needed. When installed, said cap member 60 can be secured against lip member 24 using elongate bolts 61 that are received within threaded bores 18. Moreover, said accessory cap member 60 can be constructed of aluminum, reinforced plastic or other suitable material, such that said cap member 60 can rest against a machined lip member 24 inside rim assembly 20. Referring to FIG. 3, said cap member 60 is shown installed within said wheel assembly 10 using elongate bolts 61 secured within threaded bores 18.

Figure 4:
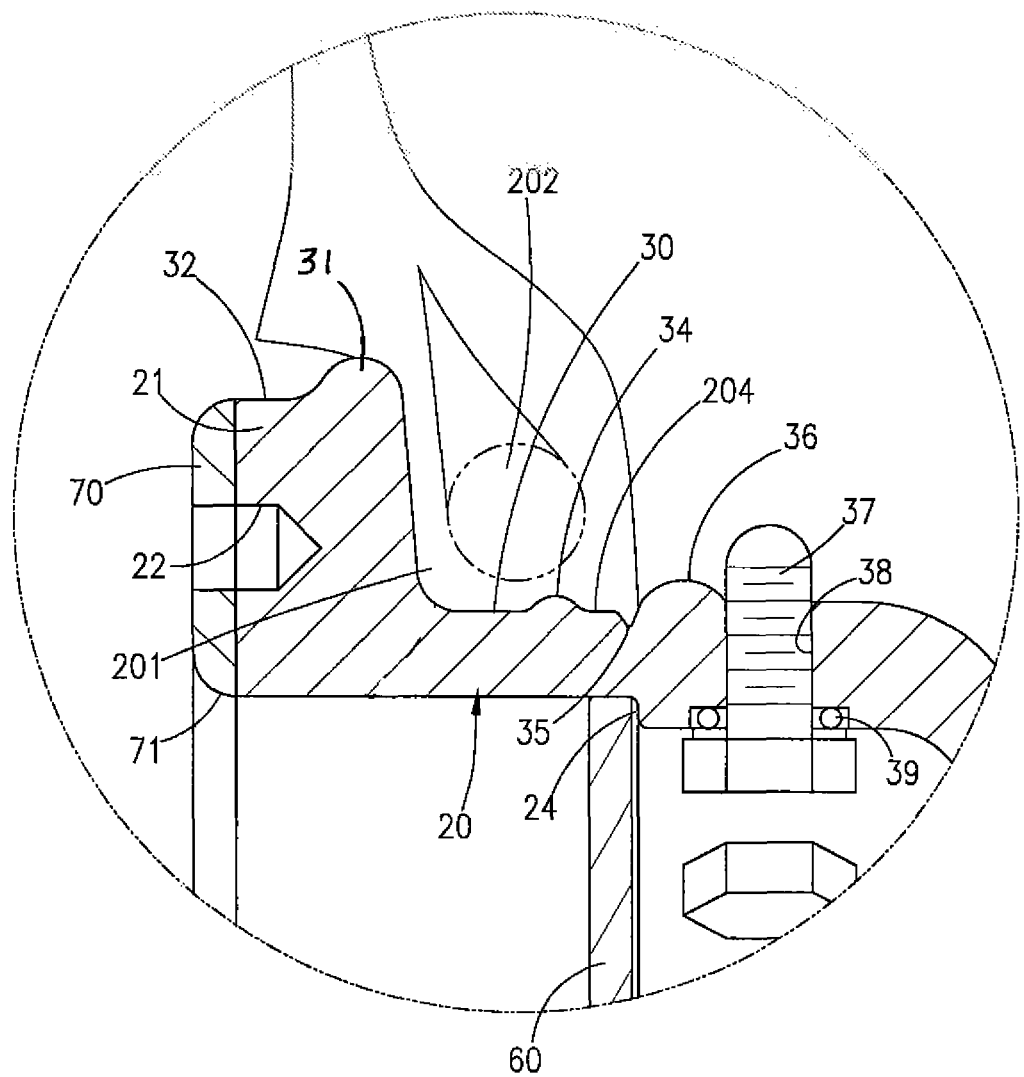
FIG. 4 depicts a detailed side sectional view of the area highlighted in FIG. 3.

FIG. 4 depicts a side sectional view of the outside bead seat area highlighted in FIG. 3. In the preferred embodiment, rim assembly 20 has a rim flange 31 that defines a reinforced outer abrasion ring 21 and outside bead seat area 30. Outer abrasion ring 21 can be either a full cast as part of the wheel assembly or machined, and may come in different configurations and materials adding an additional layer of abrasive protection for extreme use of wheel assembly 100.

The shape of rim flange 31 of rim assembly 20 allows a tire 200 to flex around rim assembly 20 without chaffing or cutting. A recessed bead notch 32 is provided on rim flange 31. Because wheel assembly 100 of the present invention is adapted for use in extreme conditions, including when tire 200 has reduced air inflation pressures for trail, off-highway or other use, bead notch 32 of the present invention allows for normal tire movement, as well as significant lateral deflection of tire 200 around rim flange 31 and abrasion ring 21 without cutting tire 200. Said bead notch 32 also allows clearance for tires that are equipped with "rim guards" or wheel guards. Without such bead notch 32, said rim guards can act as a fulcrum and unseat a tire bead in extreme deflection conditions, particularly at low air inflation pressure.

Cast abrasion ring 21 provides additional strength to rim assembly 20, as well as tire protection, especially during use in hostile environments or difficult conditions. Said abrasion ring 21 can beneficially include a plurality of dimples 22 disposed on the outer surface of said abrasion ring 21. Said dimples 22 can serve as structural indicators; if a gouge or gash on said abrasion ring 21 penetrates such ring 21 deeper than said dimples 22, it serves as an indicator that structural integrity is compromised.

In some cases an additional optional sacrificial ring 70 may be attached to said abrasion ring 21 of wheel assembly 100, typically with flush mount fasteners. Said ring 70 can be constructed of stamped steel or machined metal, or other material having desired characteristics. Said ring 70 is beneficially designed so that it can be gouged or damaged in normal operation without compromising operational integrity. Rounded lower edge 71 eliminates "sharp" edges so that rocks, dirt or other debris can slide off of said wheel assembly 100.

Optional removable accessory cap member 60 can be installed on wheel assembly 100. When installed, said cap member 60 can be secured against lip member 24, preventing mud, snow and/or other debris from collecting within said wheel assembly 100.

Generally, when a tire is under inflated and exposed to significant lateral deflection, a tire bead can become distorted which, in turn, can allow air to escape between the tire bead and rim (bead seat). In order to prevent this from occurring, at least one "air retention rib" 34 is formed on bead seat area 30. Such air retention rib 34 acts to compress tire bead 201 forming a bundle in a. relatively small area. At normal on-road or highway tire pressures, air pressure within tire 200 forces tire bead 201 (including chafing against rim flange 31), thereby creating a required fluid pressure seal. However, even at low inflation pressures, air retention rib 34 helps to ensure air retention.

Air retention rib 34 also acts as a fulcrum. In extreme inward deflection of tire 200, tire bead 201 is forced inward by the weight of a vehicle; normally such force may be sufficient "pop the bead" resulting in deflation of tire 200. However, air retention rib 34 provides additional resistance, thereby causing tire bead 201 to pivot over said air retention rib 34 and, thus, forcing foot 204 of tire bead 201 into safety bead groove 35 (resulting in additional resistance to tire bead unseating and deflation). Additionally, secondary retention rib 36 (also known as a "bead hump or safety bead") is also provided on bead seat area 30. Secondary retention rib 36 may be of different configurations, from a smooth "traditional" hump, to a sharp but slightly tapered hump, depending on desired retention under extreme deflection angles.

In the preferred embodiment, a plurality of locking pins 37 may be installed near the inner most side of bead seat area 30. Such locking pins 37 are installed within bolt holes 38 formed in rim flange 31; additionally, elastomer (O-ring) members 39 can be installed within said holes 38. Said locking pins 37 further ensure that tire bead 201 remains seated against bead seat area 30 and will not become unseated (i.e., "lose the bead") even under extreme conditions. A centering lip is also provided to assist in the centering and inflation of the outer bead, while also providing a boss for locking pins 37.

Wheel assembly 100 of the present invention can be cast, machined billet or forged or machined from aluminum alloys or steel suitable for expected use including for support and rigors of extreme off highway use. Further, because wheel assembly 100 of the present invention can be used in extreme conditions, corrosion protection can be beneficially addressed in and around the entire wheel assembly 100. Specifically, in the preferred embodiment, an alloy material can be used which is resistant to salts, water, high alkali soils, as well as any other highly abrasive or corrosive material. Said corrosion protection can maintain cosmetic appearance and structural integrity.

Additionally, an optional layer of specialty paints and/or coatings can be provided as a defense against corrosion, abrasion and/or pitting; different coatings may be used in different areas for different functions and some areas may not be coated at all but left natural or anodized for protection.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. A wheel assembly comprising:
   a. a hub portion;
   b. a disk portion;
   c. a rim assembly having a central axis comprising:
      (i) a pair of bead seats oriented substantially parallel to one another, wherein each of said bead seats further comprises:
         aa) a curved surface oriented substantially parallel to said central axis of said rim assembly adapted to receive a tire bead;
         bb) a rim flange defining a reinforced ring disposed on an outboard surface of said rim flange;
         cc) a first retention rib extending from said curved surface, wherein said first retention rib is adapted to compress at least a portion of said tire bead;
         dd) a second retention rib extending from said curved surface, wherein said second retention rib is adapted to retain said tire bead between said second retention rib and said rim flange;
(ii) a well disposed between said bead seats, and
(iii) a plurality of locking pins extending through each of said bead seats, wherein said locking pins are disposed between said second retention rib of each bead seat and said well.

2. The wheel assembly of claim 1, wherein said disk portion has a substantially concave shape.

3. The wheel assembly of claim 1, further comprising a plurality of holes extending through said rim assembly.

4. The wheel assembly of claim 1, further comprising two valve stem holes extending through said rim assembly.

5. The wheel assembly of claim 4, wherein said two valve stem holes are oriented one hundred eighty degrees from each other around the circumference of said rim assembly.

6. The wheel assembly of claim 1, further comprising a plurality of gauge holes disposed in said ring member.

7. The wheel assembly of claim 1, further comprising a sacrificial cover disposed on an outboard surface of a reinforced ring member of a rim flange.

* * * * *